July 17, 1928.
E. C. MORGAN
1,677,399
CHAIN CUTTER AND METHOD OF CUTTING KERFS
Filed Aug. 13, 1923  2 Sheets-Sheet 2
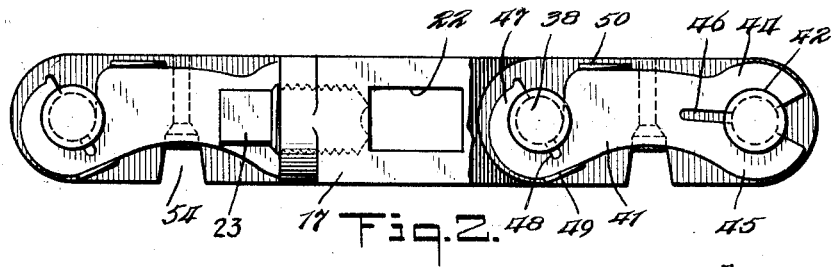
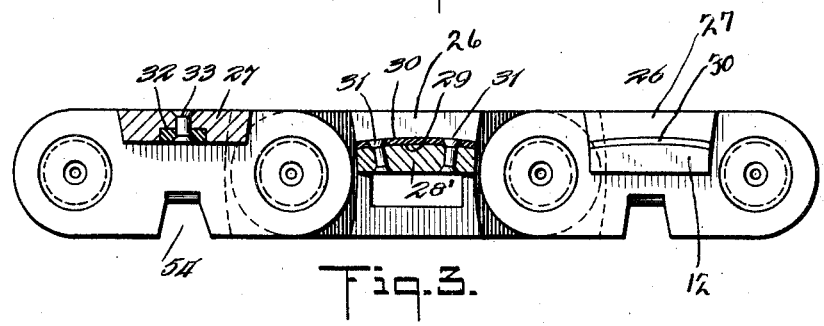
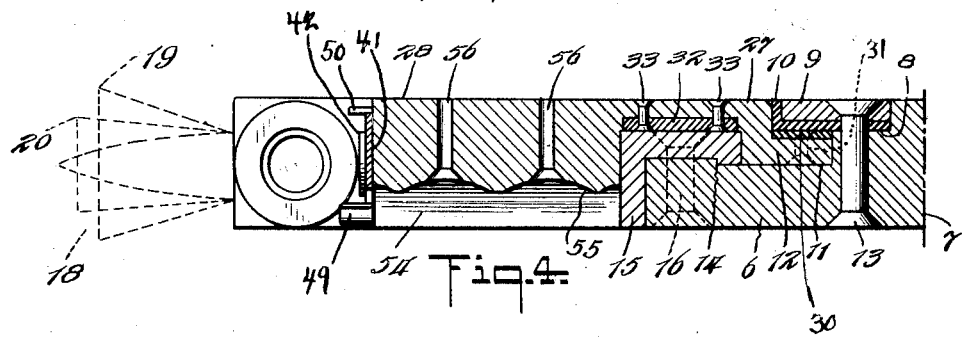
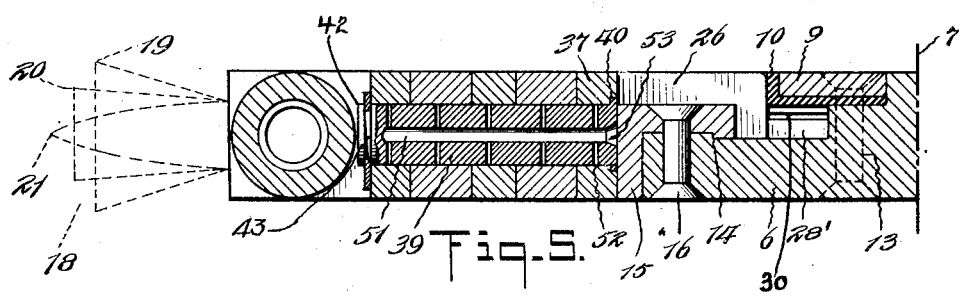
INVENTOR
Edmund C. Morgan, Deceased
by Olive Eugenie Morgan Executrix.
by Nissen & Crane
ATTORNEYS.

Patented July 17, 1928.

1,677,399

UNITED STATES PATENT OFFICE.

EDMUND C. MORGAN, DECEASED, LATE OF NEW YORK, N. Y., BY OLIVE EUGENIE MORGAN, OF NEW YORK, N. Y., EXECUTRIX.

CHAIN CUTTER AND METHOD OF CUTTING KERFS.

Application filed August 13, 1923. Serial No. 656,987.

The invention relates to improvements in chain cutters for mining machines and is particularly adapted to that type of coal mining machines which includes loop chain core cutters comprising cutter frames having unobstructed core openings therethrough.

One of the objects of the invention is the provision of improved mechanism for supporting and guiding a cutter chain along one edge or side of a cutter frame.

A further object of the invention is the provision of wear plates between the cutter frame and the chain cutter, thereby decreasing the cost of construction and lengthening the life of the cutter frame and the cutter chain.

A further object of the invention is the provision of improved means for facilitating the lubrication of the pivotal connections between the links of the cutter chain.

Another object of the invention is the provision of detachable clips or holding devices applicable to the outer pivotal connections between the chain links.

A further object of the invention is the provision of an improved bit socket provided with extensions to facilitate holding in place the means for securing the bits in position to provide sufficient clearance for movement of the chain cutter and the cutter frame along the kerf produced by the chain cutter.

Another object is an improved method of cutting kerfs by producing a deep narrow groove and widening the same by successively following wide cutters.

A further object of the invention is the provision of interlocking connections between the cutter chain and the cutter frame to provide guiding means for the cutter chain while maintaining the thickness of the cutter frame approximately equal to that of the chain cutter so that the latter, together with the cutter frame, may move freely along a kerf of minimum thickness, thereby reducing the cuttings to a minimum, particularly when used in a coal mining machine of the type having the cutter frame entering and emerging from the mine wall and therefore with an unobstructed core opening extending therethrough.

Another object of the invention is the provision of improved construction in the cutter chain to adapt the same to be efficiently engaged by the teeth of a driving sprocket.

A further object of the invention is the provision of detachable individual wear plates between the cutter chain and the guide frame, so that such wear plates may be made of such material as to take the wear while the castings with which they engage may be preserved.

Other objects of the invention will appear hereafter, the novel features and combinations being set forth in the appended claims.

Referring to the accompanying drawings, Fig. 1 is a plan view of a portion of the improved cutter chain mounted on a portion of the improved cutter frame;

Fig. 2 is an end view indicated by the broken line 2—2 on Fig. 1;

Fig. 3 is a sectional elevation of Fig. 1, taken on the line 3—3, looking in the direction of the arrows;

Fig. 4 is a transverse sectional elevation taken on the line 4—4 of Fig. 1, looking in the direction of the arrows; and Fig. 5 is a sectional elevation of Fig. 1, taken on the line 5—5, looking in the direction of the arrows.

Figure 1:
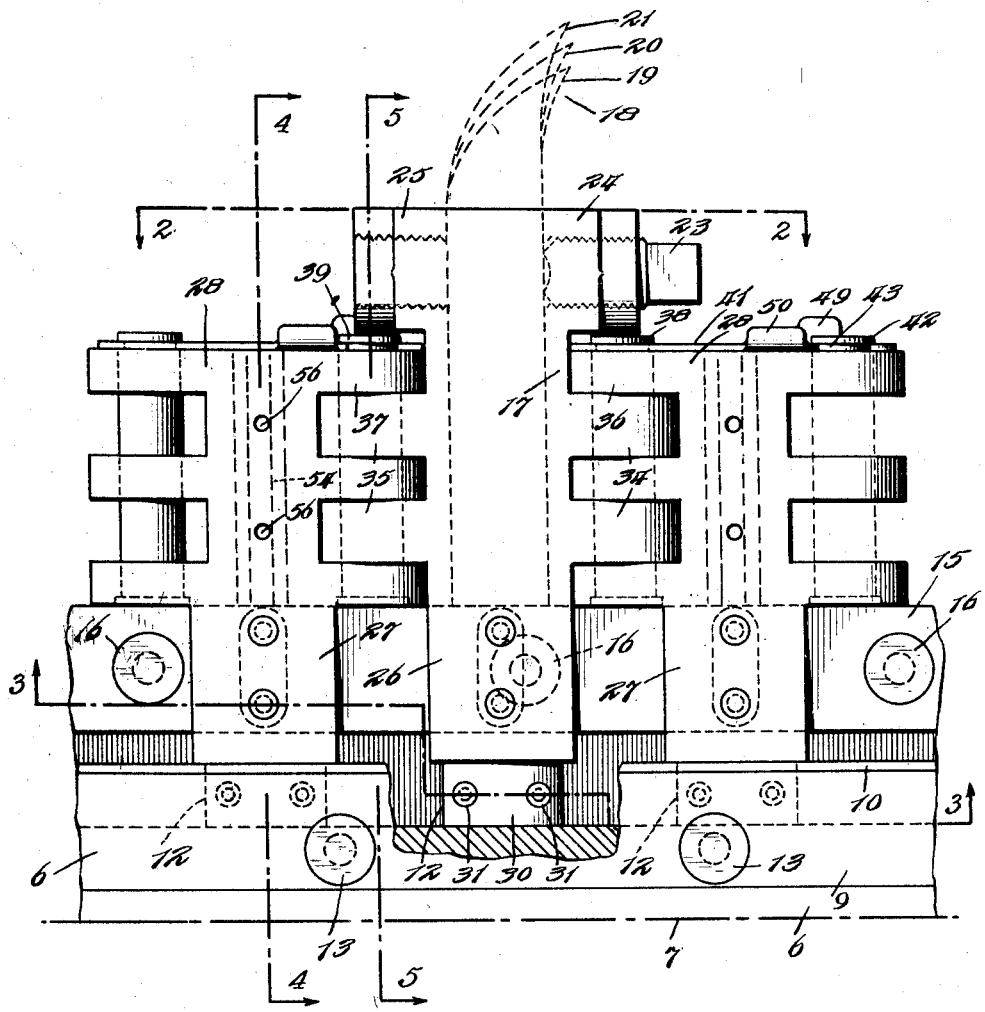

As shown in Figs. 1, 4 and 5, 6 designates a cutter frame which may be extended toward the right, as viewed in Figs. 4 and 5, such distance as may be desired to secure requisite strength. This is indicated by the broken line 7 in Figs. 1, 4 and 5. In the angular recess 8 of the cutter frame 6 may be located the flat strip 9 with an angular wear plate 10 intervening. The flat strip 9 extends toward the left, as viewed in Figs. 4 and 5, to form a recess 11 to receive the extensions 12 which are connected to the cutter chain at intervals, as shown in Fig. 1. The rectangular strip 9 and the angular metal wear plate 10 may be secured rigidly to the cutter frame 6 by means of rivets 13, as shown in Figs. 1 and 4.

The inner portion of the cutter frame 6 is provided with an angular recess at 14 to receive the angular strip 15, one portion of which fits into the recess 14, as shown in Fig. 4, and another portion of which extends over the inner end of the cutter frame 6. The angular strip 15 may be secured rigidly to the frame 6 by means of the rivets 16, which are spaced at intervals along the angular strip 15, as shown in Fig. 1.

It will thus be seen that the cutter frame may be composed of the metal casting 6 with the strips 9 and 15 riveted thereto, and so also the angular wear plate 10, to form re-entrant guiding grooves for the chain cutter, the cutter frame thus composed being of the thickness equal to that of the cutter chain.

The cutter chain comprises a plurality of pivotally connected links, every other one of which is provided with a bit socket. One of these bit sockets is shown at 17 in Fig. 1. The dotted lines 18 illustrate diagrammatically the positions of the bits in the sockets, as distributed along the cutter chain. In the same manner the dotted lines 18 in Figs. 4 and 5 illustrate the end view of three successive bits in three successive bit sockets, respectively. The bit which extends out the farthest is illustrated at 21 and provides for a narrow groove to be made, while the next succeeding bit 20 in the next succeeding socket is wider, but shorter, but can operate after the groove has been cut by the bit 21. Finally, the third bit, spaced back from the two forward ones, in the position shown at 19, in Figs. 1, 4 and 5, acts to produce a kerf of sufficient width to provide clearance for the forward movement of the chain and its guide frame. This arrangement, therefore, provides a method of cutting the kerf in which an elongated pointed tool first produces a groove to facilitate removal of coal adjacent to same by a succeeding tool acting along the upper and lower portions of the groove made by the first tool. The third tool is shorter than the other two, but acts to widen the kerf above and below that produced by the two preceding tools. In this manner the second and third tools each have double operating actions above and below the groove produced by the first tool.

As shown in Fig. 2, the bit socket 17 is provided with a transverse opening 22, which is rectangular in cross-section and adapted to receive the shank of the cutting tool. The bit shank may be extended through the bit socket to the inner forward face of the vertical strip 15. While initially the tool shanks may be fully extended to the plate 15 to occupy such positions that the tools will be located as represented in Figs. 4 and 5, they may be varied in adjustment after the tools become worn and are re-sharpened and therefore shortened. The set screw 23 may be relied upon for securing the tool shanks in adjusted position in the bit sockets. The latter is provided with forwardly and rearwardly extending projections 24 and 25, either of which may be used to receive the set screw 23.

The bit socket 17 is provided with a rectangular extension 26, which is shown in plan view in Fig. 1 and in elevation in Fig. 5. A similar projection 27 extends from the connecting link 28. The projection 27 is shown in plan in Fig. 1 and in sectional elevation in Fig. 4. Both of the extensions 26 and 27 are Z-shaped so as to fit into the re-entrant groove which extends longitudinally of the cutter frame 6.

It should be understood that the innermost extension 28' from 26 is rigidly attached to the latter. This part 28' has a curved upper surface, as shown at 29 in Fig. 3. On top of this curved surface 29 is secured a curved wear plate 30, as by means of rivets 31, but it should be noted that such wear plate 30 may be detachably secured to the extension 28' to facilitate renewal of the wear plate when worn out. In a similar manner additional elongated wear plates 32 may be secured by rivets 33, or by means of detachable connections, to the bottom of the extension plate 26. The wear plates 32 may fit into recesses, as shown in Fig. 3. The wear plates 32 are preferably located not only on the bottom of each of the extensions from the bit sockets, but also on the bottom of each of the extensions 27 from the connecting links 28.

As explained above, the chain cutter and the guiding mechanism therefor are particularly adapted for use in a mining machine wherein the cutter frame is in loop formation with an unobstructed core opening extending therethrough. The cutter frame will, therefore, be curved where the chain is guided downwardly along the kerf spaced back from the face of the mine wall and also where the chain is guided forwardly in beginning its travel from the body of coal out toward the face. At such curved portions of the cutter frame the curved wear plates 30 can have a variable line of contact with the wear plate 10 beneath the strip 9. This arrangement enables the chain to make sharper turns without binding or undue wear of the extensions 28 in the re-entrant grooves. It is preferred to have the driving sprocket engage the chain on the underside, as viewed in Fig. 1, particularly when the cutter frame is loop-shaped for a core cutting machine because then the thrust due to the pulling on the chain may be taken, to a large extent, by the upper inner surfaces of the frame 6, as viewed in Fig. 4, while the thrust due to feeding movement to the left, as viewed in Fig. 4, is taken over a distributed surface. The feeding thrust is taken by the left-hand end of the wear plate 10, to a large extent, but also by the left-hand wall of the recess 11 and the left-hand surface of the angle strip 15, as viewed in Fig. 4.

The bit socket 17 is provided with two pairs of hinge extensions 34 and 35, which are spaced apart as shown in Fig. 1 to receive the hinge extensions 36 and 37 on the connecting links 28. Pivot pins 38 and 39 extend through the hinges of the links in the manner illustrated in Fig. 5. Each pivot pin is provided with an annular collar 40, which fits into an annular recess in the hinge projection 37. Therefore, when the pivot pin 39 engages the forward wall of the strip 15 it will be held in proper position, but inasmuch as the wall 15 extends to positions adjacent the sprocket, but no farther, provision is made for clamping the pivot pins detachably in pivoted position.

The clip or retaining device for holding the pivot pins in proper position is shown at 41 in Figs. 1 and 2. It will be seen that the outer ends of the pivot pins are provided with annular collars 42, so as to form an annular groove 43, into which may be inserted the jaws 44 and 45 between which is a slot 46. Therefore, when the clip 41 is made of spring metal it may be snapped over the collar 42 so as to fit into the groove 43. The other end of the clip 41 is provided with a single jaw 47 and a slot is provided at 48 so that after the jaws 44 and 45 are put in position on the collar 42 a hammer-blow may be exerted on the offset plate 49 to spring the jaw 47 over the collar at the outer end of the pivot pin 38. The pivot pins will thus be held securely in position while free pivotal motion is permitted between the links and between the pivot pins and the clips. When it is desired to release the clip 41 a hammer-blow may be exerted on the projection 50 to release the jaw 47 from the pivot pin 38 whereupon it will be easy to release manually the jaws 44 and 45 from the collar 42.

Each pivot pin is preferably provided with a concentric lubricating passage 51 which leads to radiating passages 52 as shown in Fig. 5 so that when a lubricant is forced into the opening 53 it will be distributed along the outer cylindrical portion of the bearing pin to the hinge bearings between the links of the chain.

In a co-pending application Serial No. 656,988, filed August 13, 1923, there is shown, described and claimed a mechanism in connection with the driving sprocket for introducing a lubricant into the orifice 53 and along the passage-ways in the pivot pins to the bearings between the chain links.

The connecting links 28 are provided with transverse grooves 54 the inner surfaces of which may have the contour and arcuate recesses as shown at 55 so as to fit the teeth of the sprocket chain in such a manner that foreign material such as lubricant mixed with dirt or filings may be forced by the sprocket teeth through the passage-ways 56 in the links 28. By providing the transverse recesses 54 in the connecting links 28 the full strength of the bit socket links may be maintained.

It should be noted that by the use of the wear plates a close fit can be made between the interlocking mechanism and the cutter frame and this close fit maintained after considerable wear, by renewing the wear plates in such a manner as to attain this end.

Obviously, those skilled in the art may make various changes in the details and arrangement of parts without departing from the spirit and scope of the invention as defined by the claims hereto appended, and it is therefore desired not to be restricted to the precise construction herein disclosed.

Having thus fully described and shown an embodiment of the invention, what is desired to be secured by Letters Patent of the United States, is:

1. In a chain cutter for mining machines, the combination with a cutter frame, of a longitudinal strip secured thereto to form a guiding groove, a wear plate on the bottom and front edge of said longitudinal strip, and an additional longitudinal angular strip secured to the front portion of said frame to co-operate with said first-named strip to complete the guide for the chain.

2. In a chain cutter for mining machines, the combination of a cutter frame composed of a plurality of parts one being L-shaped in cross-section secured together to form a re-entrant guide for one edge of the chain having its pivotal axes in the plane of the cutter frame, and a removable wear plate secured to the cutter frame at the inner upper portion of said guide.

3. In a chain cutter for mining machines, the combination with a cutter frame having a thickness approximately equal to the thickness of the chain, of interlocking guiding mechanism at one side of the frame and between the upper and lower surfaces thereof so as to be within the confines of the upper and lower surfaces of said frame and the chain while the pivotal axes of the latter are in the plane of said frame, and detachable means on said frame in connection with the guiding mechanism to take up the wear.

4. In a chain cutter for mining machines, the combination with a link, of a projection extending laterally from the link and adapted to move along the guide frame, an L-shaped extension from said projection having a curved surface on one side thereof, and a curved wear plate fitting said curved surface and secured thereto.

5. In a chain cutter for mining machines, the combination with a cutter frame, of a chain, projections extending laterally from the links of said chain in the direction of the pivotal axes between said links, guiding mechanism between said cutter frame and said projections to hold the chain with their pivotal axes in the plane of said frame, and a plurality of renewable wear plates between said frame and said projections for maintaining close-fitting interlocking connection between the cutter frame and said chain.

6. In a chain cutter for mining machines, the combination with a chain having links with rectangular projections thereon, one extending laterally from each of said links in approximate parallelism to the pivotal axes between said links, of wear plates, one secured to the bottom of each of said projections, a cutter frame, and interlocking connections between said frame and said chain comprising a guide-runway in sliding connection with said wear plates to hold the chain with their pivotal axes between the links in the plane of said frame.

7. In a chain cutter for mining machines, the combination with a chain having links, of a guide frame, a re-entrant guide groove along one side of said frame, and interlocking connections between said chain and said guide groove to hold the chain with the axes between said links in the plane of said frame, said interlocking connections comprising a projection extending from one edge of the chain in approximate parallelism to the axes between said links with a line of contact between a curved surface of such projection and a portion of said guide groove.

8. In a chain cutter for mining machines, the combination with a chain having a plurality of links pivotally connected on axes in the plane of the chain, of means for mounting cutters on one edge of the chain in position to cut a kerf in the plane of said pivotal axes, transverse recesses in some of the links adapted to receive the teeth of the driving sprocket mounted in a plane extending transversely of the plane of the chain and of the plane of the kerf cut, and means for directing foreign material from said recesses through the respective links to eject such foreign material from the spaces where the sprocket teeth act to drive the chain.

9. In a chain cutter for mining machines, the combination with a link having a transverse recess adapted to receive the tooth of the driving sprocket mounted in a plane approximately at right angles to the plane of action of such link, of auxiliary recesses for receiving accumulations of foreign material, and a plurality of passageways extending transversely through the link to eject such foreign material when such tooth enters the first-named recess.

10. In a chain cutter for mining machines, the combination with a plurality of links, of a pivot pin between said links and having one end flush with the adjacent end surfaces of said links to adapt the same to move along a guideway, a lubricating passage extending axially through said pivot pin from a permanently opened inner end at such guideway to a permanently closed outer end remote from the guideway, and additional lubricating passageways extending radially through said pivot pin from said first-named passageway to the bearing surface of said pivot pin.

11. In a chain cutter for mining machines, the combination with a plurality of links, of pivotal connections between the same, spring clips comprising split jaws connected to one pivot and a rotary jaw connected to the other pivot, and mechanism adapted to receive hammer-blows for releasing the rotary jaw.

12. In a chain cutter for mining machines, the combination with a plurality of links, of pivots for said links comprising pivot pins each having an annular retaining collar at one end and an annular groove at the other end, retaining mechanism adapted to engage a pair of such pivot pins at the annular groove, said retaining mechanism comprising a pair of split jaws at one end and a split arcuate jaw at the other end, and extensions from said retaining mechanism for receiving pressure to release such retaining mechanism.

13. A chain comprising pivotally connected links, pivot pins therefor, and detachable retaining clips connecting a pair of pivot pins to hold them in predetermined relation to the links, each detachable retaining clip comprising a pair of split jaws at one end for pivotal connection to a pivot pin and a split arcuate jaw at the other end for swinging movement into engagement with another pivot pin.

14. A chain comprising pivotally connected links, pivot pins therefor each having an annular collar at one end fitting into an annular recess of a link with adjacent surfaces of the link and pivot pin end flush with each other, said pivot pins each having an annular groove at their ends remote from the annular collars, and detachable spring clips adapted to be snapped into an annular groove of one pivot pin for pivotal movement thereon into retaining engagement with the annular groove of the next pivot pin of the chain to hold the pivot pins in proper relation with the links and to hold the said annular collars in said annular recesses.

15. In a chain cutter for mining machines, the combination with a plurality of links, of pivot pins one between each link and the next adjacent link, a bit socket extending entirely through one of said links transversely of the chain and adapted to receive the shank of a bit, a pair of extensions from said bit socket located adjacent the outer edges of the chain and both extending longitudinally thereof respectively over the ends of the adjacent pivot pins, and means mounted in one of said extensions for securing the bit in adjusted position in said bit socket.

16. A bit socket for mining machine chain cutters comprising a recess to receive a bit, lateral extensions to receive pivot pins, projections extending along the outer edge of the chain over the outer ends of the pivot pins, and means in both of said projections for receiving a securing device to hold the bit in such recess in adjusted position.

17. In a chain cutter for mining machines, the combination with a plurality of pivotally connected links, of bit sockets carried by some of said links, and a plurality of cutters carried by the successive bit sockets, one cutter being shaped to cut a deep central groove narrow in width, and other cutters following and shaped to cut angular grooves into the side walls of the first groove to widen the kerf gradually.

18. In a chain cutter for mining machines, the combination with a plurality of links pivotally connected together, of a cutter frame, and interlocking guiding connections between one edge of said links and said frame in approximate parallelism to the pivotal axes between said links and comprising a curved extension fitting into the deepest groove in said frame.

19. A cutter chain for mining machines comprising pivotally connected links, pivot pins between said links, annular collars on the pivot pins and fitting in annular recesses with the adjacent ends of the pivot pins flush with the adjacent surfaces of the links to adapt the same to move along a guideway, means for retaining the pivot pins in such flush position, and lubricating passageways extending axially and radially through said pivot pins.

20. A cutter chain for mining machines comprising a plurality of pivotally connected links, pivot pins therefor, a supporting frame, interlocking guiding connections between said links and said supporting frame, annular collars on said pivot pins and fitting in annular recesses to form flush link bearing surfaces, lubricating passageways extending axially and radially through said pivot pins, and detachable spring clips connected between pivot pins opposite the ends having the annular collars.

21. In a chain cutter for mining machines, the combination with a cutter frame, of a longitudinal strip secured thereto to form a guiding groove, and an additional longitudinal strip L-shaped in cross-section and secured to the front portion of said frame to co-operate with said first-named strip to complete the guide for that form of cutter chain having its pivotal axes between links in the plane of said frame.

22. In a chain cutter for mining machines, the combination with a cutter frame having a guide groove intermediate its edges, of a longitudinal strip L-shaped in cross-section and secured to the front edge of said frame to complete the guide for that form of chain having its link pivots on axes in the plane of said frame, and means fitting the guide and adapted to support such a chain.

23. In a chain cutter for mining machines, the combination with a cutter frame, of a cutter chain comprising a plurality of pivotally connected links, an interlocking guide connection between said frame and said chain to hold the latter with axes of its pivots in the plane of said frame during the operation of the chain cutter, and removable means for taking the wear between the frame and said interlocking guide connection.

24. In a chain cutter for mining machines, the combination with a cutter frame having a guide groove therein, of a cutter chain having pivotally connected links, and interlocking connections between said frame and said chain to hold the latter with its pivotal axes in the plane of said frame and in the plane of said chain, such interlocking connections comprising an extension into said groove with one surface curved on an axis parallel to the aforesaid axes.

Signed at New York, in the county and State of New York, this 31st day of July 1923.

OLIVE EUGENIE MORGAN,
*Executrix of the Estate of Edmund C. Morgan, Deceased.*